United States Patent
Das et al.

(10) Patent No.: US 12,432,223 B1
(45) Date of Patent: Sep. 30, 2025

(54) EMBEDDED INTRUSION DETECTION SYSTEM FOR INDUSTRIAL CONTROLLERS

(71) Applicant: Board of Trustees of the University of Alabama, for and on behalf of the University of Alabama in Huntsville, Huntsville, AL (US)

(72) Inventors: Rishabh Das, Huntsville, AL (US); Thomas Heath Morris, Huntsville, AL (US)

(73) Assignee: Board of Trustees of the Univeristy of Alabama, for and on behalf of the University of Alabama in Huntsville, Huntsville, AL (US)

( * ) Notice: Subject to any disclaimer, the term of this patent is extended or adjusted under 35 U.S.C. 154(b) by 350 days.

(21) Appl. No.: 17/548,109

(22) Filed: Dec. 10, 2021

Related U.S. Application Data

(60) Provisional application No. 63/143,430, filed on Jan. 29, 2021.

(51) Int. Cl.
*H04L 9/40* (2022.01)
*G05B 19/4063* (2006.01)

(52) U.S. Cl.
CPC ...... *H04L 63/1416* (2013.01); *G05B 19/4063* (2013.01); *G05B 2219/45103* (2013.01)

(58) Field of Classification Search
CPC ............ H04L 63/1416; G05B 19/4063; G05B 2219/45103
USPC ......................................................... 726/23
See application file for complete search history.

(56) References Cited

U.S. PATENT DOCUMENTS

| | | | |
|---|---|---|---|
| 9,660,994 B2 | 5/2017 | McQuillan et al. | |
| 9,967,274 B2 | 5/2018 | Corrales et al. | |
| 10,027,699 B2 | 7/2018 | Wei et al. | |
| 11,178,176 B2 | 11/2021 | McCann et al. | |
| 2016/0103992 A1* | 4/2016 | Roundy | G06F 21/554 726/23 |
| 2017/0149811 A1* | 5/2017 | Corrales | G05B 19/4185 |
| 2017/0264629 A1* | 9/2017 | Wei | G05B 19/058 |
| 2019/0324440 A1* | 10/2019 | Cella | G05B 23/0289 |
| 2021/0048796 A1 | 2/2021 | Rieger et al. | |

(Continued)

OTHER PUBLICATIONS

Cromik, et al., "Improving SCADA Security of a Local Process with a Power Grid Model," ICS & SCADA Cyber Security Research, 2016, pp. 114-123.

(Continued)

*Primary Examiner* — Zi Ye
(74) *Attorney, Agent, or Firm* — Jon E. Holland; Butler Snow LLP

(57) ABSTRACT

An intrusion detection system can be embedded in an industrial controller to detect an attack on an industrial control system. The intrusion detection system can detect an attack by determining if there are anomalies related to the network traffic in the industrial control system and/or by determining if the devices (e.g., sensors and actuators) connected to the industrial controllers of the industrial control system are not operating within expected ranges. To assist in determining if the devices of the industrial control system are not operating properly, the industrial controllers can also be networked together in a peer-to-peer network that permits each industrial controller to share its state information with the other industrial controllers.

19 Claims, 7 Drawing Sheets

(56) References Cited

U.S. PATENT DOCUMENTS

| | | |
|---|---|---|
| 2021/0099423 A1 | 4/2021 | Flaus |
| 2021/0182385 A1* | 6/2021 | Roychowdhury ....... G06N 7/01 |
| 2021/0382989 A1 | 12/2021 | Wei et al. |
| 2022/0046033 A1 | 2/2022 | Tang |

OTHER PUBLICATIONS

Lin, et al., "Runtime Semantic Security Analysis to Detect and Mitigate Control-Related Attacks in Power Grids," IEEE Transactions on Smart Grid, Jan. 2018, pp. 163-178, vol. 9, No. 1.

Alves, et al., "Embedding Encryption and Machine Learning Intrusion Prevention Systems on Programmable Logic Controllers," Apr. 2018, pp. 1-6.

Das, et al., "On the Edge Realtime Intrusion Prevention System for DoS Attack," Proceddings of ICS & SCADA, 2018, pp. 84-91.

Werth, "A Specification-Based Intrusion Prevention System for Malicious Payloads," NCS, 2019, pp. 153-168.

Alves, et al., "Virtualization of Industrial Control System Testbeds for Cybersecurity," Computer Security 77, 2018, pp. 531-546.

Das, et al., "Modeling a Midstream Oil Terminal for Cyber Security Risk Evaluation," Critical Infrastructure Protection, 2018, pp. 149-175.

Griffith, "Using Modeled Cyber-Physical Systems for Independent Review of Intrusion Detection Systems," NCS, 2019, pp. 116-125.

Alves, et al., "OpenPLC: An IEC 61131-3 Compliant Open Source Industrial Controller for Cyber Security Research," Computer Security 78, 2018, pp. 364-379.

Werth, et al., U.S. Appl. No. 17/548,115 entitled, "Embedded Intrusion Prevention System for Industrial Controllers," filed Dec. 10, 2021.

\* cited by examiner

EMBEDDED INTRUSION DETECTION SYSTEM FOR INDUSTRIAL CONTROLLERS

CROSS-REFERENCE TO RELATED APPLICATIONS

This application claims the benefit of U.S. Provisional Patent Application No. 63/143,430, entitled "EMBEDDED INTRUSION DETECTION SYSTEM FOR DETECTING ATTACKS ON INTERDEPENDENT CONTROLLERS FROM INDUSTRIAL CONTROL SYSTEMS" and filed on Jan. 29, 2021, which application is incorporated herein by reference.

STATEMENT REGARDING FEDERALLY SPONSORED RESEARCH OR DEVELOPMENT

This invention was made with Government support under NSF 1623657 awarded by the National Science Foundation. The Government has certain rights in the invention.

BACKGROUND

The present application generally relates to an intrusion detection system that can be embedded into an industrial controller, such as programmable logic controller (PLC), for an industrial control system.

Industrial control systems can be used to monitor and control the physical systems and processes associated with many critical infrastructures such as power generation and/or distribution, oil and gas production and/or distribution, water distribution and/or waste-water treatment systems, communication systems, building management systems and transportation systems. A typical industrial control system can use many "edge" industrial controllers that directly interface with the components of the physical system used for monitoring and controlling the process variables. The edge controllers can then communicate with a "main" computer having a user interface that permits an operator to monitor and control the entire physical system and corresponding processes via interactions with individual edge controllers.

Due to the importance of these critical infrastructures, a critical infrastructure may be the subject of a cyberattack attempting to disable or disrupt the critical infrastructure for political or monetary gain. To defend against cyberattacks, the corresponding industrial control systems can have intrusion detection systems that detect when an attack is happening and take steps to mitigate against the attack. The intrusion detection system is typically located in the main computer because the edge controllers do not typically include any security features and are dependent on the main computer to provide protections against a cyberattack. However, if the intrusion detection system of the main computer is ineffective and the main computer is compromised, then the attacker can have access to any of the edge controllers (and their corresponding connected components) to implement an attack on the physical system and processes because the edge controllers would view any message from the main computer as being authentic. Thus, it would be beneficial to have an intrusion detection system in the edge controllers as a last line of defense against cyberattacks on physical systems and processes.

BRIEF DESCRIPTION OF THE DRAWINGS

Wherever possible, the same reference numbers are used throughout the drawings to refer to the same or like parts.

DETAILED DESCRIPTION

The present application generally pertains to an intrusion detection system (IDS) that can be embedded in an industrial controller (such as a programmable logic controller (PLC)) of an industrial control system. The IDS can detect anomalies related to 1) the network traffic associated with the industrial controllers of the industrial control system, and 2) the operation of the devices or components (e.g., sensors and actuators) connected to the industrial controllers. The industrial controllers can also be networked together in a peer-to-peer network that permits each industrial controller to share information (such as network information and state information) with the other connected industrial controllers to better enable the embedded IDS to detect anomalies. In addition, the sharing of information amount the industrial controllers permits each industrial controller to have a view of the entire industrial control system.

In an embodiment, the IDS can identify and block injection attacks and denial of service (DOS) attacks on the industrial controllers. In addition, the IDS can identify man-in-the-middle (MiTM) attacks between the industrial controllers and trusted nodes (e.g., "master" controllers, computers with a human-machine interface (HMI), etc.). The embedded IDSs can use a private peer-to-peer network (of the industrial controllers) to share the state information of the industrial controllers among the IDSs. The IDS can also incorporate a pre-trained long short term memory (LSTM) neural network that predicts the integrity of the neighboring industrial controllers based on the state information for the neighboring industrial controllers received from other IDSs via the peer-to-peer network.

In another embodiment, an intrusion detection system can be embedded into each industrial controller of an industrial control system that is used to control a physical process. The intrusion detection system can use a clustering algorithm to evaluate the network traffic of the industrial control system with regard to a normal baseline. The intrusion detection system can also have embedded state estimators to predict future states of the devices in the industrial control system. The intrusion detection system can further have an anomaly detector that evaluates the predicted future states of the devices with respect to actual state information associated with the devices. The intrusion detection system can share state information about devices connected to the industrial controller with other industrial controllers in the industrial control system using a peer-to-peer network. The intrusion detection system can use received state information from other industrial controllers (over the peer-to-peer network) to predict the behavior of correlated devices in the industrial control system. Finally, the intrusion detection system can automatically write packet filtering rules to block attacks against the industrial controller.

Figure 1:
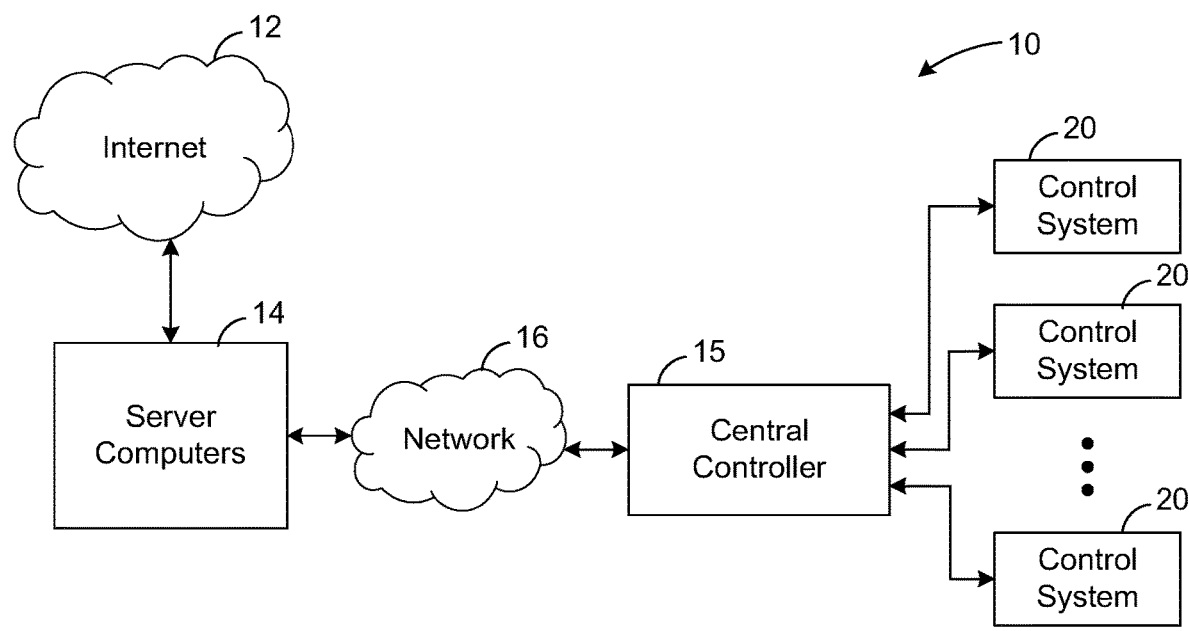
FIG. 1 is a block diagram showing an embodiment of an industrial network.

FIG. 1 shows an embodiment of an industrial network 10. As shown by FIG. 1, the industrial network 10 includes a central controller 15 that can be used to control multiple industrial control systems 20. In an embodiment, one or more of the industrial control systems 20 can be supervisory control and data acquisition (SCADA) systems that can be used to control industrial processes. The central controller 15 can be connected to one or more server computers 14 by a network 16 to facilitate communications between the server computers 14 and the central controller 15. In an embodiment, the network 16 can be a local area network (LAN) or a wide area network (WAN).

The server computers 14 can be connected to the Internet 12 to permit the industrial network 10 to communicate with other networks via the Internet 12. In an embodiment, the server computers 14 can include servers for corporate communications and business systems, email servers, domain name system (DNS) servers, and any other server needed by the industrial network 10. In addition, the server computers 14 may be isolated from the Internet 12 and the network 16 by demilitarized zones (DMZs). A DMZ (also referred to as a perimeter network) can be a physical sub-network that acts as a mediatory network architecture for connecting devices to prevent the devices from being exposed to a larger and untrusted network. Each DMZ can include a firewall having three or more interfaces, rather than the typical public and private interface.

The central controller 15 can be used to monitor and record field data from the control systems 20. Some examples of central controllers 15 include centralized monitoring systems, historians and data acquisition servers. Each control system 20 can include field devices, field controllers and nodes capable of monitoring and controlling the field devices (via the field controllers) using a human-machine interface (HMI). The HMI nodes can be considered to be "trusted" nodes because the signals and commands from these nodes to the field controllers and field devices are considered legitimate by the field controllers and field devices. An operator can query or send commands to the field controllers with the HMI node to gain visibility or to change process settings across the field devices. The field controllers (e.g., programmable logic controllers (PLCs)) can sample and process analog and digital data from the field devices and can use the processed data for internal decision making using pre-programmed, user-defined logic. The field devices can be edge devices that communicate the state of the physical processes (controlled by the control system 20) to the field controller and can be edge devices that are used to change the state of the physical process. For simplicity of illustration, FIG. 1 depicts three control systems 20 and one central controller 15, but there can be any number of control systems 20 or central controllers 15 in other embodiments.

Figure 2:
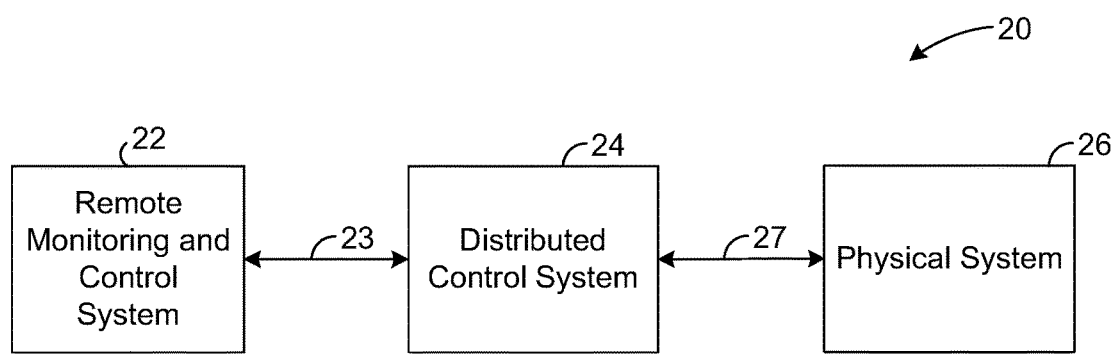
FIG. 2 is a block diagram showing an embodiment of the industrial control system from the industrial network of FIG. 1.
Figure 3:
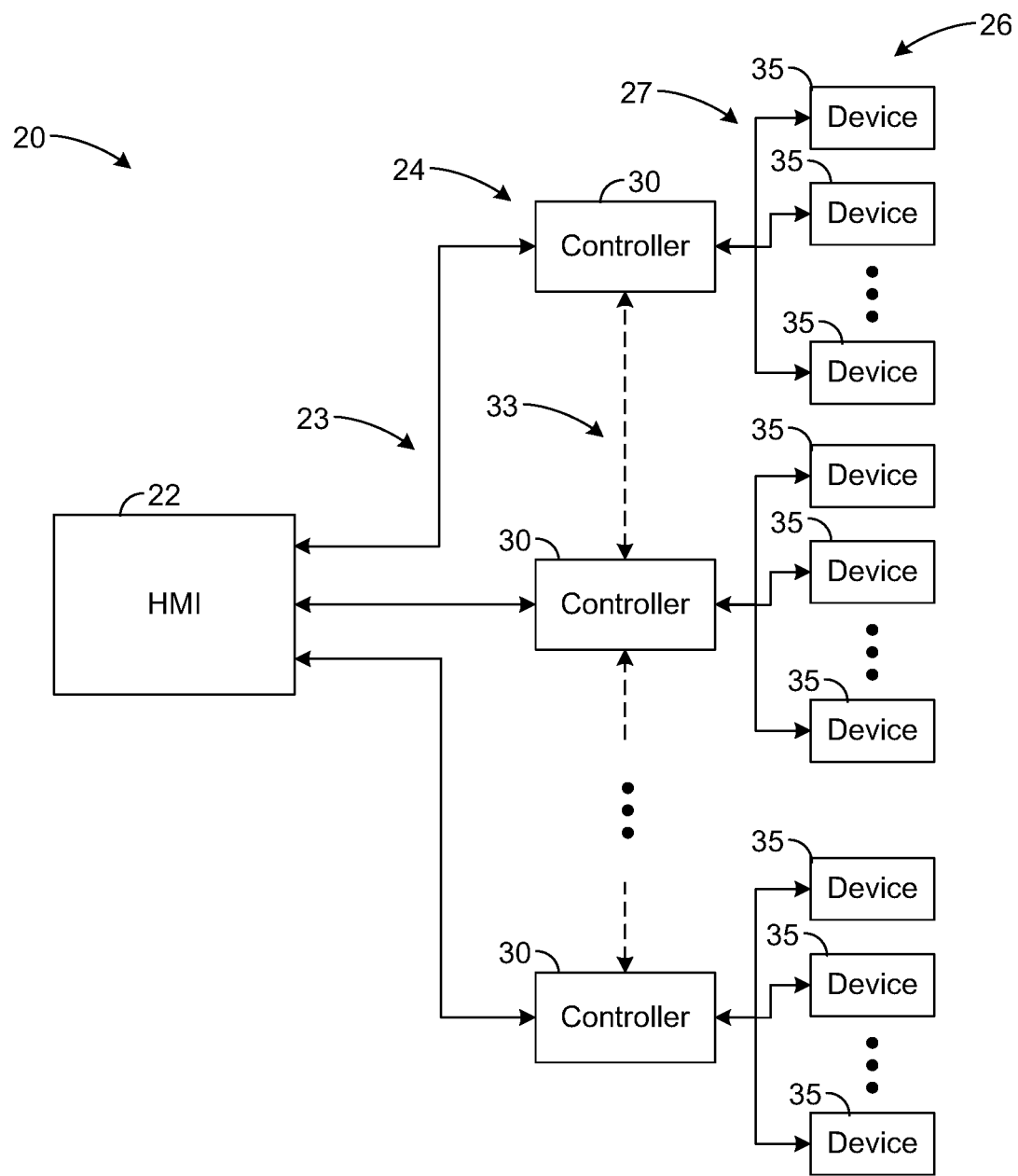
FIG. 3 is a block diagram showing an embodiment of the specific components of the industrial control system of FIG. 2.

FIGS. 2 and 3 show embodiments of the control system 20. In one embodiment, the control system 20 can include a remote monitoring and control system 22 that is connected to a distributed control system 24 by a network 23. The distributed control system 24 can be connected to the physical system 26 by a cyber-physical link 27. In an embodiment, the remote monitoring and control system 22 can include a human-machine interface (HMI) as shown in FIG. 3 and the network 23 can utilize a suitable SCADA protocol for communications. The distributed control system 24 can include multiple controllers 30 (see FIG. 3), which can be programmable logic controllers (PLCs) in one embodiment. The distributed control system 24 can be connected to multiple devices 35 (see FIG. 3) in the physical system 26. For simplicity of illustration, FIG. 3 depicts one HMI 22, three controllers 30 and nine devices 35, but there can be any number of HMIs 22, controllers 30 or devices 35 in other embodiments.

The remote monitoring and control system 22 can include HMIs, historians, data loggers and user management systems (e.g., Active Directory, RADIUS, etc.) that manage the physical process data and provide the interface for user interaction and control. The HMI 22 can be a front-end interface by which operators can interact with the monitored variables of the control system 20. The HMI 22 can include a display (or screen) that presents a graphical user interface to the operator. The graphical user interface can provide one or more buttons, alarms, reports or trends that can be used for monitoring, analyzing and controlling the processes of the control system 20. In an embodiment, the HMI 22 can be located locally in a process (or control) panel that is connected to and in proximity to the controllers 30. However, in other embodiments, the HMI 22 can be executed on computers in a control room located remotely from a process or control panel connected to the controllers 30. The HMI 22 can use the corresponding network protocol of network 23 (e.g., a SCADA network protocol) to communicate with the controllers 30 of the distributed control system 24 to gather information about the process variables and display them on the screen. In addition, the HMI 22 can use the corresponding network protocol of network 23 to send control actions and other types of messages to the devices 35 (see FIG. 3) via the controllers 30. For example, in the Modbus network protocol, the communication is defined in a master-slave scheme and the Modbus network protocol provides four different object types that include: coils (e.g., single-bit physical output); discrete inputs (e.g., single-bit physical input); input register (e.g., analog input readings); and holding register (e.g., analog output values or memory).

The network 23 can be implemented in one or more communication mediums such as telephone communications, Ethernet, radio communications and/or satellite communications. In an embodiment, the network 23 can use the Modbus protocol for communications between the controllers 30 and the HMI 22 (or other nodes of the remote monitoring and control system 22). In other embodiments, the network 23 may use different protocols for communications such as PROFIBUS, WorldFIP, ControlNet, EtherNet/IP, DNP3, and/or A-B DF1. In still other embodiments, the network 23 may use multiple protocols over different communication mediums resulting in the need for a protocol gateway to provide a mechanism for enabling devices communicating on different protocols to talk to each other. Additionally, the network 23 may also have supplementary devices such as bridges, routers and switches, to control the network traffic, and may be physically separated (e.g., with air gap) or logically separated (e.g., with a virtual LAN or data diodes) from other networks in the control system 20.

The distributed control system 24 can include one or more controllers (or edge controllers) 30 that can directly interface with the devices 35 (e.g., sensors and actuators) of the physical system 26 through the cyber-physical link 27 as shown in FIG. 3. In addition, as shown in FIG. 3, the controllers 30 can communicate with each other using a peer-to-peer (P2P) network 33. The controllers 30 can be field units that have embedded control capabilities in order to accomplish some logic operations. In an embodiment, the controllers 30 can be programmable logic controllers (PLCs). The controllers 30 can be responsible for collecting signals from some of the devices (e.g., sensors) 35 through the cyber-physical link 27, processing the received signals from the sensors according to pre-defined programming, and then sending response signals to other devices (e.g., actuators) 35, also through the cyber-physical link 27.

In an embodiment, the controller 30 can utilize either discrete signals or analog signals. Discrete signals are signals that assume one of two possible states (e.g., either on or off or 1 or 0). Analog signals can take on a range of values, and can represent a time varying quantity such as temperature, pressure, density, etc. Discrete signals require only one bit to be stored in memory and are fast to read and write. In contrast, analog signals require more bits to be stored in memory (where the number of bits will depend on the hardware used to read the signal) and can be slower to read and write when compared to discrete signals. The controller 30 can use two types of hardware for processing analog signals: an analog-to-digital converter (ADC) for signal reading and a digital-to-analog converter (DAC) for signal writing. The ADC converts the analog quantity into an integer number, while the DAC converts an integer number into an analog quantity.

The cyber-physical link 27 provides a transport medium for signals to be communicated between the physical system 26 and the distributed control system 24. In an embodiment, the cyber-physical link 27 can utilize one or more of Fieldbus, Highway Addressable Remote Transducer (HART), WirelessHART and/or Zigbee to communicate signals and information between the physical system 26 and the distributed control system 24. Fieldbus is an industrial network system used to connect instruments in a manufacturing plant to industrial controllers. HART is a hybrid analog-digital industrial automation protocol that can send digital messages overlaid on the legacy 4-20 mA analog instrumentation current loops. WirelessHART is a time synchronized, self-organizing, and self-healing mesh network architecture, developed as a multi-vendor interoperable wireless standard for sensor networks. Zigbee is a low-power wireless mesh network standard targeting long battery life devices in wireless control and monitoring applications. In other embodiments, the cyber-physical link 27 may just incorporate plain electrical wires that directly transport voltage or current signals.

The physical system 26 can have devices 35 used to implement one or more physical processes associated with power generation, oil/gas production, water/waste-water treatment, wind farms, large communication systems, building management systems and/or transportation systems. The devices 35 (e.g., sensors and/or actuators) can be used to monitor and control process variables associated with the physical processes. A sensor can be a device that measures a physical quantity (e.g., pressure, temperature, flow, density, etc.) and converts the measurement into an electric signal which can be read by an observer (via the HMI 22) or by an instrument. An actuator can be a component of a machine in the physical system 26 that is responsible for moving or controlling a mechanism in the physical system 26 in response to an input control signal from the distributed control system 24. In an embodiment, the actuator can be the mechanism by which the control system 20 can control the physical process and act upon the corresponding environment.

Figure 4:
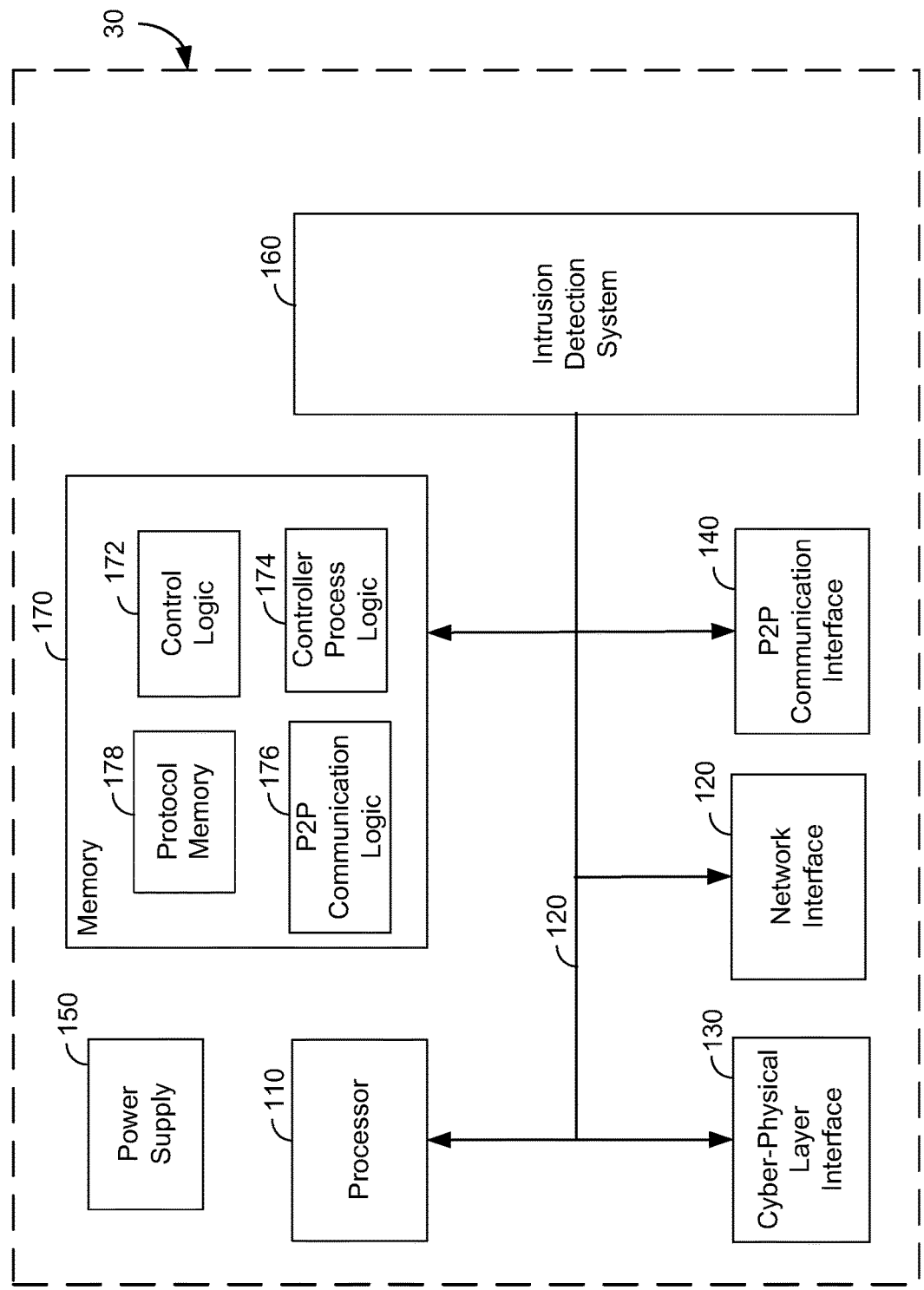
FIG. 4 is a block diagram of an embodiment of the industrial controller of FIG. 3.

FIG. 4 shows an embodiment of the controller 30. The controller 30 shown by FIG. 4 can include logic 172, referred to herein as "control logic," for generally controlling the operation of the controller 30. The controller 30 also includes logic 174, referred to herein as "controller process logic," and logic 176, referred to herein as "P2P communication logic." The controller process logic 174 can be used for receiving and processing information received from devices 35 (e.g., sensors) and generating instructions or commands (based on the received information) for the devices 35 (e.g., actuators). The P2P communication logic 176 can be used to facilitate the communication of messages between the controllers 30 over the P2P network 33. In other embodiments, the controller process logic 174 and/or the P2P communication logic 176 can be combined with the control logic 172 or with one another. The controller 30 can also include an intrusion detection system 160 to determine when the controller 30 or the control system 20 may be under attack and once the determination of an attack has been made to take corrective actions to mitigate the attack. The control logic 172, the controller process logic 174, the P2P communication logic 176 and the intrusion detection system 160 may be implemented in software, firmware, hardware, or any combination thereof. In FIG. 4, control logic 172, the controller process logic 174, the P2P communication logic 176 and the intrusion detection system 160 are implemented in software. The control logic 172, the controller process logic 174 and the P2P communication logic 176 may be stored in memory 170. However, other configurations of the control logic 172, the controller process logic 174, the P2P communication logic 176 and the intrusion detection system 160 are possible in other embodiments. In addition, while the intrusion detection system 160 is shown as a separate component in FIG. 4, the intrusion detection system may be stored in memory 170 in other embodiments.

Note that the control logic 172, the controller process logic 174, the P2P communication logic 176 and the intrusion detection system 160, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The controller 30 may include at least one conventional processor 110, which includes processing hardware for executing instructions stored in the memory 170. As an example, the processor 110 may include a central processing unit (CPU) or a digital signal processor (DSP). The processor 110 communicates to and drives the other elements within the controller 30 via a local interface 120, which can include at least one bus. When the control logic 172, the controller process logic 174, the P2P communication logic 176 and the intrusion detection system 160 are implemented in software, the processor 110 may execute instructions of the control logic 172, the controller process logic 174, the P2P communication logic 176 and the intrusion detection system 160 to perform the functions ascribed herein to the control logic 172, the controller process logic 174, the P2P communication logic 176 and the intrusion detection system 160.

The controller 30 can have numerous ports (not specifically shown) that can provide connections to communication interfaces for the controller 30 to communicate with other components of the control system 20. As shown in FIG. 4, the controller 30 can include a network interface 120, a cyber-physical layer interface 130 and a P2P communication interface 140. While the network interface 120, the cyber-physical layer interface 130 and the P2P communication interface 140 are shown as separate interfaces in FIG. 4, two or more of the interfaces may be combined into a single interface in other embodiments. The network interface 120 enables the controller 30 to communicate with the HMIs 22 and other nodes of the remote monitoring and control system. The cyber-physical layer interface 130 enables the controller 30 to communicate with the devices 35. The P2P communication interface 140 enables the controller 30 to communicate with the other controllers 30 in the control system 20. In an embodiment, the network interface 120, a cyber-physical layer interface 130 and a P2P communication interface 140 may use separate IP ranges to permit the controller 30 to isolate each communication link provided by an interface. Each of the network interface 120, a cyber-physical layer interface 130 and a P2P communication interface 140 may include a radio or other device for communicating wirelessly and/or corresponding equipment for wired communications. The controller 30 can also have a power supply 150, which provides electrical power to the components of the controller 30 and possibly, in an embodiment, to devices 35 via the cyber-physical layer interface 130. In one embodiment, the power supply 150 has an interface that allows it to plug into or otherwise interface with an external component, such as a wall outlet or battery, and receive electrical power from such external component. If desired, the power supply 150 may incorporate one or more batteries to permit the controller 30 to be independent of the external power component.

Figure 5:
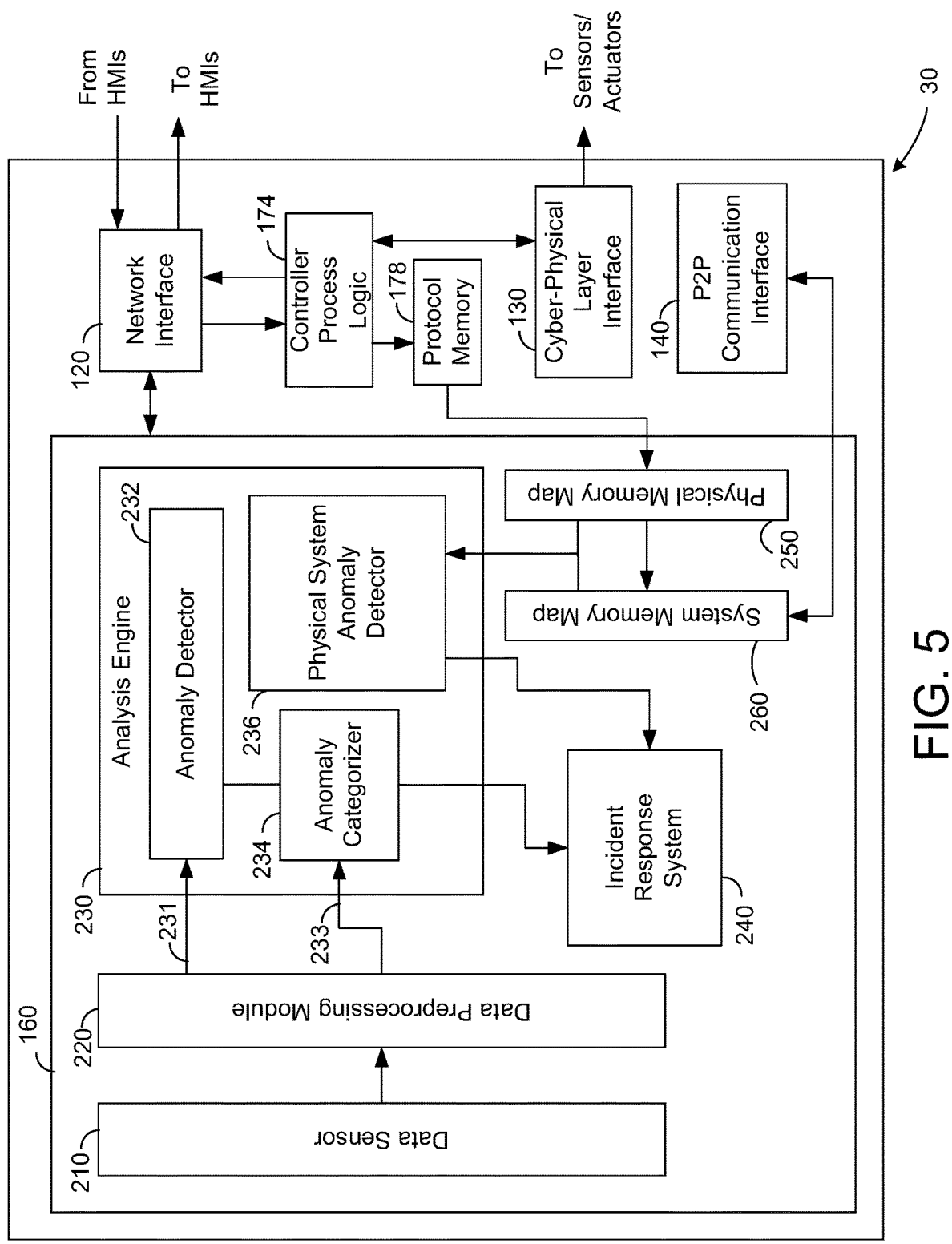
FIG. 5 is a block diagram of an embodiment of the intrusion detection system of FIG. 4.

FIG. 5 shows an embodiment of the intrusion detection system 160 within the controller 30. The intrusion detection system 160 can be connected to the network interface 120 and interact with the HMI 22 and other trusted nodes (or components) of the remote monitoring and control system. The intrusion detection system 160 can receive all of the network packets for the controller 30 (from the HMI 22 and other trusted nodes), evaluate the packets and relay the "safe" packets to the control logic 172 and/or the controller process logic 174 for subsequent action by the controller 30.

In an embodiment, the intrusion detection system 160 can reassign the ports in the network interface 120 used by the control logic 172 and/or the controller process logic 174 such that the intrusion detection system 160 receives all the packets (or communications) for the controller 30 instead of the control logic 172 and/or the controller process logic 174. For example, the intrusion detection system 160 may assign a preselected port associated with the network interface 120 (e.g., port 4321) for use by the control logic 172 and/or the controller process logic 174 for communications with the network 23. The preselected port assigned by the intrusion detection logic 160 is different from the predefined port (e.g., port 502) for communications set forth by the network protocol for network 23. The intrusion detection system 160 also establishes a packet filtering rule (e.g., an IPTable rule) in protocol memory 178 (or memory 170) that blocks external communications (both incoming and outgoing) for the preselected port assigned to the control logic 172 and/or the controller process logic 174 by the intrusion detection system 160 such that the intrusion detection system 160 controls communications between the control logic 172 and/or the controller process logic 174 and the HMI 22 (and other trusted nodes).

Once the reassignment of the port used by the control logic 172 and/or the controller process logic 174 and the execution of the packet filtering rule is completed, the intrusion detection system 160 can monitor the predefined port designated by the network protocol for network 23 for data packets. As network packets are received at the network interface 120, the intrusion detection system 160 provides the packets to a data sensor 210. The data sensor 210 can extract network telemetry information from the incoming packets from the HMI 22 (and other trusted nodes). In an embodiment, the data sensor 210 can be a real-time logger that can record and monitor changes in the attributes of the communications over the network 23, which can include the behavior of the external nodes (e.g., HMI 22 or other trusted nodes) of the remote monitoring and control system connected to the controller 30.

In an embodiment, the data sensor 210 can collect fourteen network telemetry metrics from incoming network packets. The network telemetry metrics can be a collection of features from the physical layer of the network packets. The network telemetry metrics can be obtained based on only header information and do not require any knowledge of the payload in the packet. The metrics can be classified into two categories: per-packet metrics or per-connection metrics. The data sensor 210 collects three per-packet metrics for each incoming network packet, which metrics include the number of peers (i.e., the number of unique MAC (media access control) addresses) that are sending network packets to the controller 30, the packet size (i.e., the size of the network packet in bytes) and the protocol efficiency (i.e., the amount of data each network packet carries). In an embodiment, the protocol efficiency can be expressed as the ratio of the size of the TCP (transmission control protocol) payload in bytes to the size of the network packet in bytes.

The per-connection metrics can signify the properties of the nodes (e.g., HMI 22 and other trusted nodes) of the remote monitoring and control system connected to the controller 30. For each node (e.g., HMI 22 or other trusted node), the data sensor 210 can independently calculate eleven per-connection metrics using a rolling window to compute the metrics for each node. The per-connection metrics calculated for each node can include: a mean flow of packets (i.e., the number of packets received from the node in 60 seconds); an inter-packet arrival time (i.e., the frequency at which the node sends network packets); a packet size-moving mean (i.e., the average size of the network packet in bytes over a rolling window of 1000 network packets); a packet size-moving variance (i.e., the measurement of how far the network packet sizes are spread out from the average value); a packet size-moving median (i.e., the median of the packet sizes in bytes over a rolling window of 1000 network packets); a scaled packet size (i.e., the ratio of the size of the received network packet to the size of the largest network packet sent by the node); a scaled inter packet arrival time (i.e., the ratio of the current inter-packet arrival time to the longest inter-packet arrival time recorded for the node); a number of source ports used by the client (i.e., the count of the number of TCP source ports used by the node); a number of clients using this MAC (i.e., the counts the number of IP (Internet Protocol) addresses using the MAC address of the node); an entropy of packet sizes (i.e., the Shannon entropy of the distribution containing the last 1000 network packet sizes sent by the node); and Kullback-Leibler divergence of current connectivity characteristics to baseline data (i.e., the quantification of the disparity between the normal node connection to the current behavior of the node). In other embodiments, greater than or less than 1000 network packets can be used for the size of the rolling window.

In some embodiments, the inter-packet arrival time can be computed as the difference in arrival time between consecutive packets received from each node. In one embodiment, the entropy of packet sizes can quantify the amount of information conveyed in the current network packet and provides a probability of the amount of information in the packet based on the past 1000 packets. A packet having more information would have a low probability (and would be considered surprising) and a packet having less information would have a higher probability (and would be considered unsurprising). In an embodiment, the Kullback-Leibler divergence can use a probability distribution for the network packet size and the inter-packet arrival time of the node during a period of known "normal" behavior as a baseline. As network packets are received from the node, the Kullback-Leibler divergence between the baseline probability distribution for each of the network packet size and inter-packet arrival time and the current probability distribution for each of the network packet size and inter-packet arrival time can be calculated to quantify the disparity between "normal" behavior and the current behavior.

The data preprocessing module 220 receives data tuples with the information (e.g., the network telemetry metrics) from the data sensor 210 and transforms the network telemetry metrics from the data sensor 210. The data preprocessing module 220 can transform the data tuples from the data sensor 210 into a format that is parsable by the analysis engine 230. The data preprocessing module 220 can transform the data from the data sensor 210 into one of two different sets of transformed information or data that is provided to the analysis engine 230 by respective pipelines.

The first set of transformed information can be provided to the analysis engine via a first pipeline 231. The data preprocessing module 220 can normalize the incoming data from the data sensor 210 and compresses the information of the fourteen metrics (or attributes) into a two-dimensional vector space to form the first set of transformed information. Since the network telemetry metrics have different ranges of values, the values have to be normalized so that each value is of equal importance to the analysis engine 230. For example, the network packet size can range from 66 bytes to 81 bytes, while the packet size variance can ranges from 33.443 to 36.036. Thus, since the range of network packet size is greater than the range for the packet size variance, the network packet size can have more influence on the analysis engine 230 unless the values are normalized. In one embodiment, the values of all of the metrics can be rescaled between 0 and 1 using Equation 1.

$$x_{new} = \frac{x - x_{min}}{x_{max} - x_{min}} \quad (1)$$

The data preprocessing module 220 can store the minimum and maximum value of each metric (or feature or attribute) and perform the transformation in real-time when a tuple of data is received from the data sensor 210. After normalizing the data, the data preprocessing module 220 can extract the necessary information from the fourteen metrics and project them into a two-dimensional feature space via a process called dimensionality reduction. In an embodiment, the data preprocessing module 220 can use principal component analysis (PCA) to compress the information content of the fourteen metrics (or features) into two high variance vectors, which can be highly uncorrelated and contain most of the information conveyed by the data sensor 210.

The second set of transformed information can be provided to the analysis engine 230 via a second pipeline 233. The second set of transformed information can include a subset of the 14 network telemetry metrics collected by the data sensor 210. Specifically, in one embodiment, the second set of transformed information can include normalized data for five metrics (e.g., mean flow of packets, packet size, mean packet size, protocol efficiency, and the number of source ports used by the node).

The analysis engine 230 can have an anomaly detector 232 that receives the first set of transformed information from the data preprocessing module 220 via the first pipeline 231. In an embodiment, the anomaly detector 232 can receive the normalized two-dimensional vector in the first set of transformed information into an anomaly detection algorithm. The anomaly detection algorithm can be a semi-supervised novelty detection algorithm incorporating machine learning. In other words, the anomaly detection algorithm (or the semi-supervised novelty detection algorithm) is a machine learning algorithm. In the semi-supervised novelty detection algorithm, the training data for the algorithm has no outliers and contains information on the normal behavior of the system. During training, the goal for the semi-supervised novelty detection algorithm is to learn the normal behavior of the HMI 22 and the trusted nodes communicating with the controller 30. In an embodiment, the semi-supervised novelty detection algorithm can use a method called Local Outlier Factor (LOF) that computes the local density deviation of a data point with respect to its neighbors. With the density deviation known from the training dataset, the semi-supervised novelty detection algorithm can learn the range of densities around a normal cluster of data points.

When the trained anomaly detection algorithm receives new information in the first set of transformed information from the first pipeline 231, the anomaly detection algorithm of can compute the ratio of the average densities of the point's neighbors to the density of the point itself (i.e., the LOF score). The resultant ratio can be classified into one of three different categories:

1) LOF(k)≈1—Similar density as neighbors (Normal);
2) LOF(k)<1—Higher density than neighbors (Inlier/also Normal); and
3) LOF(k)>1—Lower density than neighbors (Outlier).

The parameter k in the LOF score calculation is the distance of the point to the kth neighbor. If k is set to 5, the k-distance can be the distance of the point to the fifth closest neighbor. A higher value of k finds outliers against the entire data set while a lower value of k distinguishes outliers from local clusters. In one embodiment, k can be equal to 10 such that false negatives can be minimized and the accuracy of the anomaly detection algorithm can be maximized. However, in other embodiments, k can have values either greater than 10 or less than 10.

If the anomaly detector 232 determines that the network traffic is benign (i.e., the LOF score ≤1 and the determined data point is in proximity to the normal cluster of data points), the anomaly detector 232 forwards the data to the preselected port assigned to the control logic 172 and/or the controller process logic 174 for further processing and relays back the response of the control logic 172 and/or the controller process logic 174 to the HMI 22 (or other trusted node) as appropriate. In addition, depending on the information in the network packets, the controller process logic 174 may send messages to the devices 35 via the cyber-physical layer interface 130. However, if the LOF score determined by the anomaly detector 232 is greater than 1, then the data point determined from the information from the data tuple is isolated from the learned cluster of data points which is indicative of an anomalous data sample or an abnormality.

On detecting an abnormality with the anomaly detector 232, the analysis engine 230 receives a second set of transformed data from the data preprocessing module 220 into an anomaly categorizer 234 via a second pipeline 233. The anomaly categorizer 234 can execute an anomaly classification algorithm on the second set of transformed data to categorize the abnormality (or anomaly) identified by the anomaly detector 232 into one of three different classes. The anomaly categorizer 234 can classify the anomaly as a man-in-the-middle (MiTM) attack, a command injection attack, or a volumetric denial of service (DOS) attack. After categorizing the anomaly, the anomaly categorizer 234 can forward the categorized attack type and the IP and MAC address of the suspected attacker to the incident response system 240. While the anomaly detector 232 and the anomaly categorizer 234 are shown as separate components in FIG. 5, the anomaly detector 232 and the anomaly categorizer 234 may be combined into a single component in other embodiments.

In an embodiment, the anomaly classification algorithm can be a tree-based algorithm (e.g., a random forest classifier) with machine learning to classify anomalies or abnormalities. In other words, the anomaly classification algorithm is a machine learning algorithm. In one embodiment, the random forest classifier (of the anomaly classification algorithm) can have 200 trees, but other numbers of trees can be used in other embodiments. As discussed above, the second set of transformed data includes the normalized data for a subset of five metrics (or features) of the fourteen collected by the data sensor 210 to improve the prediction accuracy of the algorithm and prevent overfitting during the training of the random forest classifier.

In an embodiment, the training of the random forest classifier of the anomaly classification algorithm starts with normalized values for all the metrics from the data sensor 210, except for the scaled packet size, which is considered a correlated attribute to packet size because of the strong relationship between the metrics. The random forest classifier then used a method called recursive feature elimination (RFE) to build the first model using all the normalized features of the dataset (except scaled packet size). The model scores the prediction accuracy and calculates the feature importance of each attribute. Feature importance for random forest classifiers is the decrease in node impurity weighted by the probability of reaching that node. RFE prunes the least important feature from the current feature set and re-trains the classifier. This procedure was recursively repeated on the pruned set to maximize the accuracy of the classifier until the five metrics identified above were selected.

The incident response system 240 can execute a predefined set of rules to defend the controller 30 against the identified category of cyberattack. For example, on detection of a volumetric attack, (e.g., a DOS attack) or a repeated command injection attack, the incident response system 240 can log the event and execute a custom a packet filtering rule (e.g., an IPTable rule). The custom packet filtering rule can drop all incoming traffic from the attacker's IP address and stop the volumetric flood of packets from the attacker's computer. The incident response system can also restart the controller 30 to reset the state of the attacked network socket of the controller 30. Similar types of response may be implemented for other types of attacks.

The intrusion detection system 160 can also be used to identify falsified sensor readings at devices 35. The intrusion detection system 160 can include a physical system anomaly detector 236 in the analysis engine 230 to 1) detect falsified states of sensors 35 and 2) predict the states of sensors connected to peer controllers 30, if the peer controllers 30 are controlling an interdependent physical process. Effective detection of false sensor readings requires the physical system anomaly detector 236 to have the following characteristics: (i) visibility over the physical process; (ii) visibility of the states of neighboring controllers 30, and (iii) an understanding of the normal behavior of the system 20. In an embodiment, the physical system anomaly detector 236 can learn the behavior of sensors and infer the values of the sensors using the states of the actuators.

The intrusion detection system 160 can include a first physical system data sensor (also referred to as a physical memory map) 250 that can monitor the current state of the controller 30 and a second physical system data sensor (also referred to as a system memory map) 260 that maintains the state of all interconnected controllers 30. The controller 30 can receive the states of the sensors and actuators connected to the controller 30 from the cyber-physical layer interface 130 every scan cycle for the controller 30. The physical memory map (PMM) 250 can take a snapshot of the protocol memory and use corresponding address information about the sensors and actuators (which may also be stored in protocol memory 178) to interpret the values of the sensors and actuators. The readings in the PMM 250 can be updated every scan cycle for the controller 30 and can mirror the states (or values) seen by the controller process logic 174 and the HMI 22.

The system memory map (SMM) 260 can take the present state information from the PMM 250 and share the information from the PMM 250 with other SMMs 260 of other controllers 30 over the P2P network 33 via the P2P communication interface 140. In addition, the SMM 260 can also receive state information from other SMMs 260 of other controllers 30 over the P2P network 33 via the P2P communication interface 140. On receiving the state information from neighboring controllers 30, the SMM 260 can structure the information based on a configuration file. The sharing of state information by the SMMs 260 permits the intrusion detection system 160 to have visibility over the entire physical process associated with the control system 20.

The use of the P2P network 33 enables the intrusion detection system 160 of a controller 30 to share the physical state of the actuators and sensors connected to the controller 30 with other controllers 30 connected to the P2P network 33. In an embodiment, a P2P network 33 can be a distributed application architecture in which interconnected nodes or peers (i.e., the intrusion detection system 160 of each controller 30) can communicate with each other without the use of a centralized server. Each node or peer in the P2P network 33 can have equal administrative privileges and can concurrently function as a client and a server.

The network topology of the P2P network 33 in the control system 20 refers to the logical and physical interconnections between the instances of intrusion detection systems 160 in the controllers 30. The potential large scale of the control system 20 (e.g., large distances between controllers 30) requires the controllers 30 to operate in a distributed architecture. In an embodiment, the network topology for the P2P network 33 can combine both star and mesh topologies. The controllers 30 of the system 20 can be organized into a predetermined number of clusters based on the physical distance between the controllers 30. For example, controllers 30 operating in a particular sub-system of the control system 20 may be group into a cluster. Each of the clusters can behave like a star topology with all edge nodes directly connected to a randomly selected central node. The intra-cluster connections can use a partial mesh architecture that directly connects the central node of each cluster to two other central nodes of other clusters using a point-to-point connection.

Once the network topology for the P2P network 33 has been determined, the P2P communication logic 176 of each controller can provided with a configuration file that has the logical interconnectivity of each controller 30 with other neighboring controllers 30. The configuration file can include a line of network configuration parameters for each controller 30. The network configuration parameters for each controller 30 (or node) can include a node field, a neighbors field, a NIPs field and a NodeIP field. The node field includes the name of the controller 30. In an embodiment, the controllers 30 in the control system 20 can have names that incorporate sequential numbering. The neighbors field includes a list of neighboring controllers 30 connected to the current controller 30. The NIPs field includes a list of IP addresses of the connected neighboring controllers. The NodeIP field includes the IP address of the current controller 30.

In an embodiment, the P2P network 33 can use a depth-first routing algorithm that. considers the network topology as a tree data structure. Every node (i.e., controller 30) takes turns and broadcasts its physical states along each branch before backtracking. The broadcast starts from a first controller. After the first controller completes broadcasting, the first controller sends a message to the second controller to start its broadcast process. This process goes on in cycles and the controllers keep updating each other on the current state of the industrial control system 20. In an embodiment, the controllers 30 can be assigned an order by a user or automatically through a negotiation process among the controllers 30.

Figure 6:
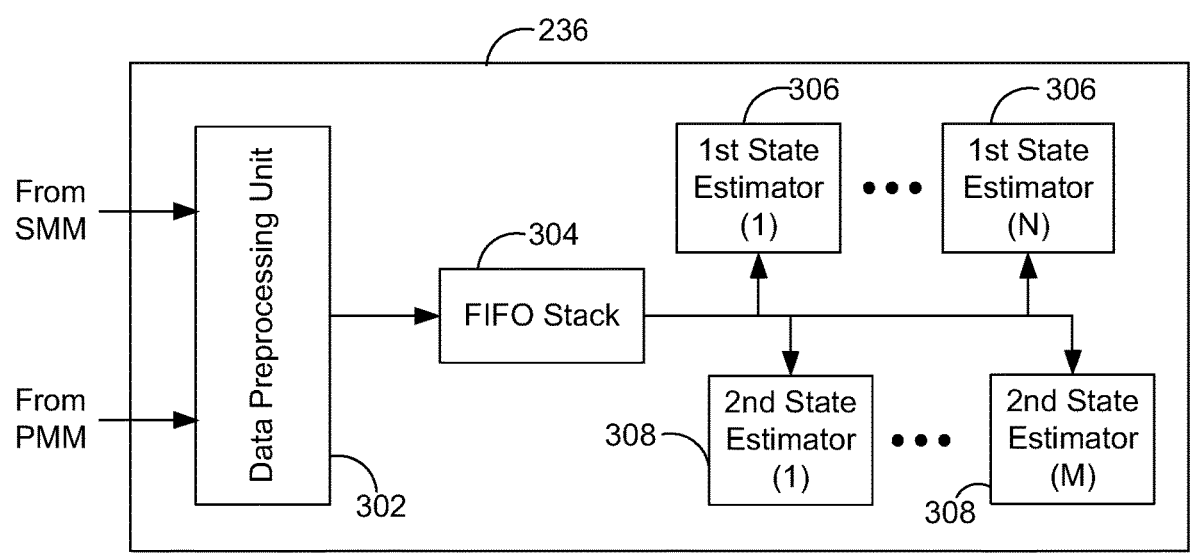
FIG. 6 is a block diagram of an embodiment of the physical system anomaly detector of FIG. 5.

The physical system anomaly detector 236 can be executed every scan cycle for the controller 30 and can use two types of state estimators to determine if any sensor readings are false or outside of a corresponding expected range. The state estimator can model the values of a continuous or a discrete system parameter. The state estimator can take the current or older system conditions as an input and predicts the state (e.g., value) of the system parameter at the current or next time step. As shown in FIG. 6, the physical system anomaly detector 236 can include a data preprocessing unit 302 that aggregates the current sensor readings from the physical memory map (PMM) 250 and the system memory map (SMM) 260. After aggregation of the sensor readings, the data preprocessing unit 302 can rearrange and/or reorder the sensor readings and provide an ordered list of sensor readings into a stack 304. In the embodiment shown in FIG. 6, the stack 304 can be a first-in, first-out (FIFO) stack, but other types of stacks can be used in other embodiments. The FIFO stack 304 can coupled to the inputs of first state estimators 306 and the inputs of second state estimators 308. The state estimators can predict a sensor value for the current timestamp. If the prediction is within a confidence interval for the corresponding sensor value, the physical system anomaly detector 236 marks the sensor value (or reading) as normal. If the prediction is outside of the confidence interval, the physical system anomaly detector 236 notifies the incident response system 240, which logs the false or anomalous sensor value (or reading). In an embodiment, the confidence interval for a predicted sensor value can correspond to a range that is one standard deviation above and below a historic value that is calculated from the sensor values for the last 10 cycles.

In an embodiment, there can be a first state estimator 306 for each sensor attached to the controller 30. Each first state estimator 306 can take the value of the corresponding sensor and changes in sensor value ($\Delta s_t = s_t - s_{t-1}$) at previous time stamps (t−1, t−2, t−3) stored in the FIFO stack 304 as inputs and predicts the change in sensor value at the current timestamp (t). There can also be a second state estimator 308 for each sensor attached to the controller 30 having a relationship with one or more sensors connected to another controller 30 in the control system 20. In other words, each sensor connected to the controller 30 can have a second state estimator 308 for each of the other controllers 30 in the control system 20 upon the other controller 30 having a connected sensor with a relationship with the sensor. Each second state estimator 308 can model correlated sensor values of interdependent processes (e.g., a change of an actuator by one controller 30 may cause changes in sensor states for other controllers 30) in the industrial control system 20. An example of an interdependent process can be the turning on of a pump by one controller that results in changes in sensor readings (e.g., changes in flow rate) at other sensors connected to other controllers 30 located downstream from the pump. The second state estimator 308 can use a change in value of one sensor (or actuator) to predict a change in value of the other sensor. To model the sensor values of the interdependent processes, the second state estimator 308 can include information that identifies the correlated sensors in the control system 20 (i.e., the sensors having a relationship with one another). In an embodiment, a Pearson Correlation Coefficient that measures the linear relationship between two sensor readings can be used to identify correlated sensors.

In an embodiment, each of the first state estimators 306 and the second state estimators 308 can be one-step forecast models that provide predictions about a single timestamp. One-step forecast models can use a stack of values containing parallel input time series (i.e., having observations at the same time steps) of sensor and actuator values. The output of the one-step forecast model depends on the input time series and predicts the value of the current timestamp. In addition, the first state estimators 306 and the second state estimators 308 can also understand spatial and temporal relations from the operational data and can infer spatial and temporal structure from the data (e.g., opening or closing a valve can cause future changes in flow rate measured downstream of the valve).

In one embodiment, the first state estimators 306 and the second state estimators 308 can both use a combination of convolutional neural network (CNN) and long short-term memory network (LSTM). The CNN-LSTM combination can be used for modeling multiple parallel input time series with spatial and temporal structure. A deep CNN architecture extracts the spatial features from a 1D input vector (e.g., the aggregated and ordered sensor information from the data preprocessing unit 302) from the FIFO stack 304 and the LSTM model interprets the features across time steps. The CNN-LSTM model can be used to infer the spatial and temporal information of the data.

The CNN-LSTM combination uses two sub-models: the CNN model for feature extraction; and the LSTM model for interpreting the features across time steps. The CNN model has three layers: a 1-D convolutional layer, a max pooling layer, and a flatten layer. The 1-D convolutional layer analyzes the rolling window from the FIFO stack 304 and extracts the salient features. In one embodiment, the rolling window from the FIFO stack 304 can have three sets of aggregated sensor information, but the rolling window may have additional sets of aggregated sensor information in other embodiments. A kernel size parameter in the 1-D convolutional layer can be used to specify the number of time steps included in each input sequence. After the feature extraction, a max pooling layer reduces the dimensionality of the feature map and a flatten layer converts the multi-dimensional feature map to a single dimensional array.

The CNN model can provide a single-dimensional array (or feature vector) to the LSTM model. Using these features, the LSTM model learns the long-term dependencies between the timestamps. The LSTM model has two layers: an LSTM layer and a dense layer. The LSTM layer holds the neural network nodes for learning the behavior of the system. In an embodiment, an LSTM layer with 200 nodes can provide the lowest Root-Mean-Square Error (RMSE) values for the operational data. The dense layer adds the outputs of the nodes and provides the final prediction. During training, the CNN-LSTM models can transform the sequence of past states from normal operating data into multiple input/output patterns called samples. The samples for the first state estimators 306 and the second state estimators 308 can include three time steps as input and one time step as output in an embodiment.

The physical system anomaly detector 236 uses the predictions from the first state estimators 306 and the second state estimators 308 and maintains a dynamic confidence interval for each of the state estimators. The dynamic confidence interval of a state estimator is the standard deviation of a rolling window containing 20 of its latest predictions. The dynamic confidence interval acts as a threshold, while measuring the variation of the state prediction from the current sensor values. If the sensor value is out of the confidence interval the physical system anomaly detector 236 notifies the incidence response system 240 to log the false sensor value.

In one embodiment, if the physical system anomaly detector 236 determines that a sensor value evaluated by one of the first state estimators 306 and the second state estimators 308 is a fake sensor value or if state information is not being received from a controller 30, the state estimator can use the predicted sensor value for that particular timestamp (instead of the fake or missing sensor value) when performing subsequent evaluations. The use of the predicted sensor values in place of fake or missing sensor values permits the state estimators to continue operation during an attack without having to use fake values in the evaluation or having an error occur from a missing value.

Figure 7:
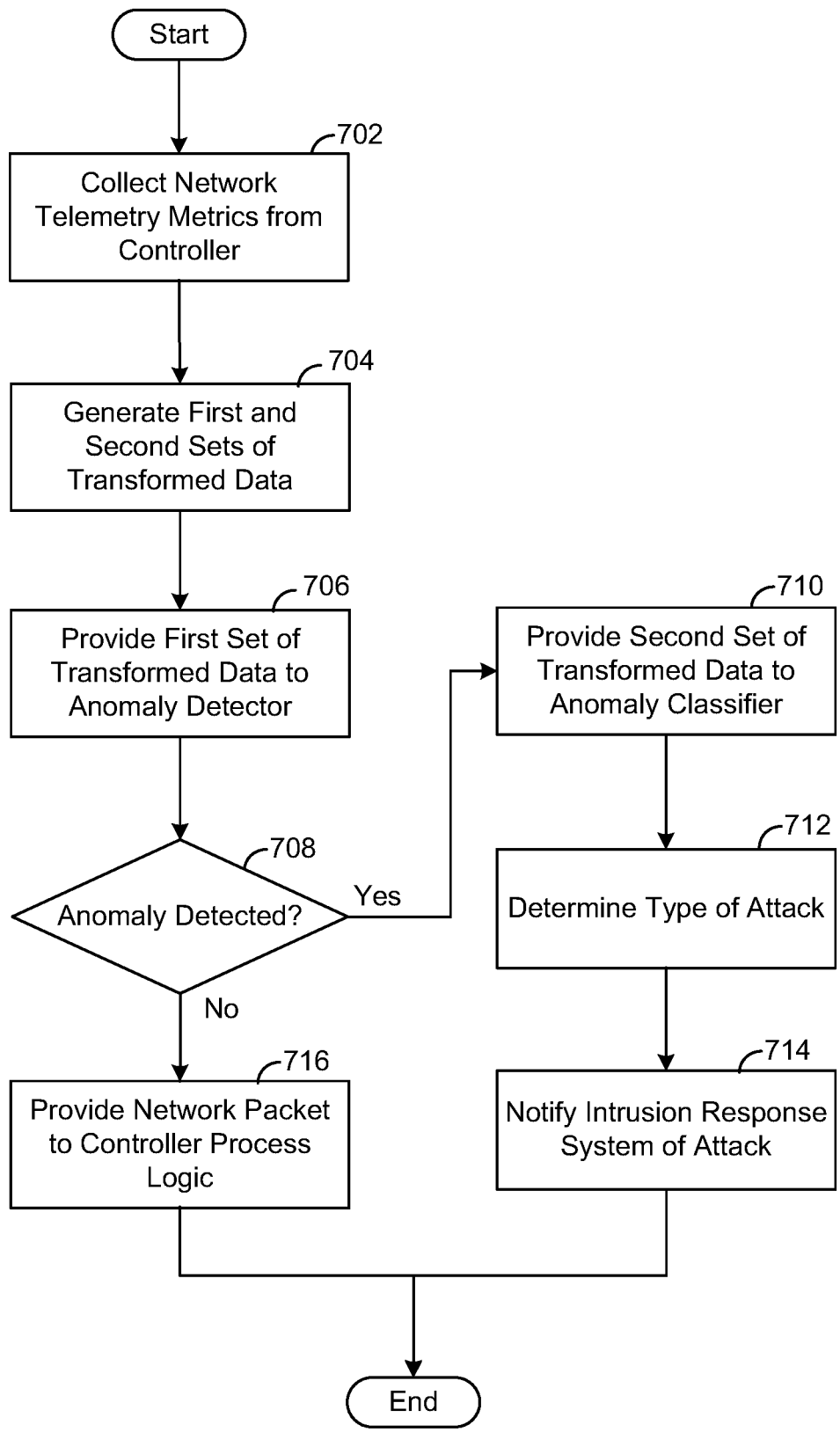
FIGS. 7 and 8 are flowcharts showing embodiments of processes for detecting attacks at industrial controllers.
Figure 8:
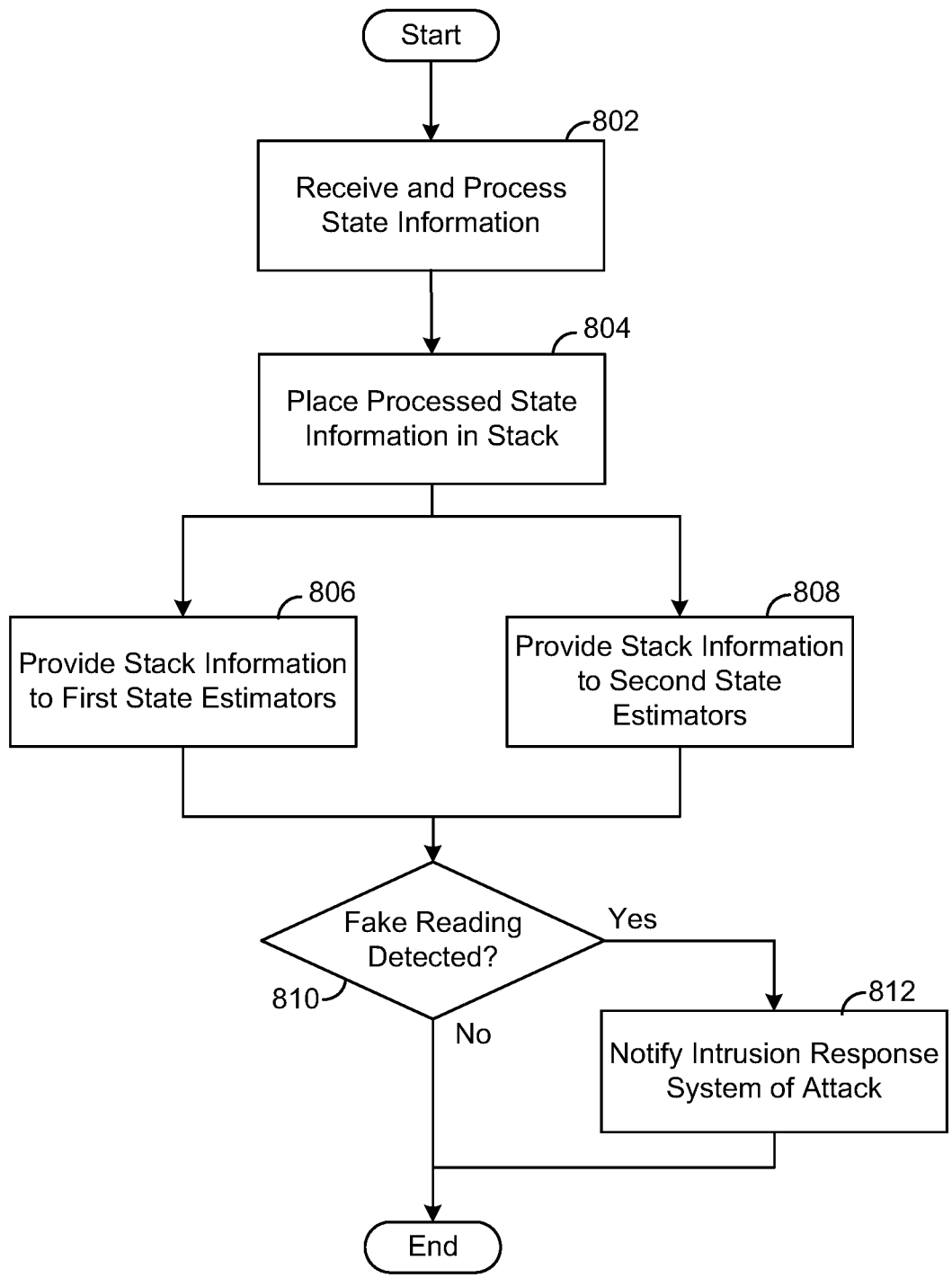

FIGS. 7 and 8 show flowcharts for detecting attacks at controllers 30. FIG. 7 shows an embodiment of a process for detecting an attack at the controller 30 using network data. FIG. 8 shows an embodiment of a process for detecting an attack at the controller 30 using state information from the devices 35. In FIG. 7, the process begins by collecting the network telemetry metrics associated with the controller (step 702). The intrusion detection system 160 for the controller 30 receives all of the network packets or messages sent to the controller 30. The received data packets or messages are then processed by the data sensor 210 to generate the network telemetry metrics.

The data sensor 210 then provides the network telemetry metrics to the data preprocessing module 220. The collected network telemetry metrics are then processed by the data preprocessing module 220 to generate first and second sets of transformed data (step 704). The first set of transformed data is provided to the anomaly detector 232 (step 706) by the data preprocessing module 220. The anomaly detector 232 determines if there is an anomaly present in the first set of transformed data (step 708) using an anomaly detection algorithm.

If an anomaly is detected in the first set of transformed data, the second set of transformed data (which is different from the first set of transformed data) is provided to an anomaly classifier 234 (step 710) by the data preprocessing module 220. The anomaly classifier 234 can then determine the type of attack at the controller 30 (step 712) using anomaly classification algorithm. The anomaly classification algorithm can categorize the attack into one of three different types of attack. After determining the type of attack, the intrusion response system 240 is notified of the attack (step 714) and the type of attack by the anomaly classifier 234. The intrusion response system 240 can then take appropriate actions to mitigate the attack based on the type of attack and the process can end. Referring back to step 708, if no anomaly is detected in the first set of transformed data by the anomaly detector 232, then the network packet that is the source of the network telemetry metrics can be released or passed from the intrusion detection system 160 to the controller process logic 174 (step 716) for subsequent processing by the controller process logic 174 and the process can end.

In FIG. 8, the process begins by the physical system anomaly detector 236 receiving and processing state information (step 802) regarding the devices 35 of the control system 20. A data preprocessing unit 302 of the physical system anomaly detector 236 can receive state information (e.g., sensor readings) regarding the devices 35 connected to the controller 30 and state information (e.g., sensor readings) regarding the devices 35 connected to other controllers 30 of the control system 20. To receive the state information about devices 35 that are connected to other controllers 30 of the control system, all of the controllers 30 in the control system can be connected by a P2P network 33 that facilitates communications among the controllers 30. The data preprocessing unit 302 can aggregate and order the received state information.

The data preprocessing unit 302 can provide the "processed" state information into a stack (step 804), such as FIFO stack 304. The state information from the stack can then be provided to a group of first state estimators 306 (step 806). The group of first state estimators 306 can process the state information in the stack to determine if one of the devices 35 connected to the controller 30 is providing "fake" or anomalous readings (step 810). In addition, the state information from the stack can also be provided to a group of second state estimators 308 (step 808). The group of second state estimators 308 can process the state information in the stack to determine if a device 35 connected to one of the other controllers 30 in the control system 20 is providing fake or anomalous readings (step 810).

If a fake or anomalous reading is detected by either of the group of first state estimators 306 or the group of second state estimators 308, physical system anomaly detector 236 can notify the intrusion response system 240 of the attack (step 812). The intrusion response system 240 can then take appropriate actions to mitigate the attack and the process can end. Referring back to step 810, if no fake or anomalous reading is detected by either of the group of first state estimators 306 or the group of second state estimators 308, then the control system 20 is operating normally and the process can end.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. An industrial controller for an industrial control system, the industrial controller comprising:
   at least one processor;
   a memory device connected to the at least one processor;
   a communication interface configured to permit communications with other industrial controllers of the industrial control system; and
   an intrusion detection system, the intrusion detection system having instructions that, when executed by the at least one processor, cause the at least one processor to:
      receive state information about one or more devices connected to the industrial controller;
      receive, from additional industrial controllers of the industrial control system via the communication interface, additional state information on additional devices connected to the additional industrial controllers; and
      evaluate, with a plurality of first state estimators and one or more second state estimators, the received state information and the received additional state information to determine whether the one or more devices or the additional devices are operating within expected ranges, wherein operation of a device outside of a corresponding expected range indicates that the industrial control system is being attacked, and wherein each of the additional devices has a corresponding first state estimator of the plurality of first state estimators and each of the one or more devices has a corresponding second state estimator of the one or more second state estimators.

2. The industrial controller of claim 1, wherein the instructions, when executed by the at least one processor, cause the at least one processor to aggregate the received state information and the received additional state information and store the aggregated state information in a stack.

3. The industrial controller of claim 2, wherein the instructions, when executed by the at least one processor, cause the at least one processor to retrieve the aggregated state information from the stack.

4. The industrial controller of claim 1, wherein the instructions, when executed by the at least one processor, cause the at least one processor to determine if the one or more devices are operating outside of expected ranges and determine if the additional devices are operating outside of expected ranges.

5. The industrial controller of claim 1, wherein the instructions, when executed by the at least one processor, cause the at least one processor to share the received state information about the one or more devices with the additional industrial controllers over a peer-to-peer network via the communication interface.

6. The industrial controller of claim 1, wherein the instructions, when executed by the at least one processor, cause the at least one processor to detect abnormalities in network traffic to the industrial controller.

7. The industrial controller of claim 6, wherein the instructions, when executed by the at least one processor, cause the at least one processor to categorize abnormalities detected by the at least one processor.

8. An industrial control system for a physical system, the industrial control system comprising:
   a plurality of controllers, wherein each controller of the plurality of controllers is connected to a plurality of devices, and wherein each device of the plurality of devices is configured to monitor or control a portion of the physical system;
   a network connecting the plurality of controllers to permit communication between the plurality of controllers;
   each controller of the plurality of controllers comprising:
      at least one processor;
      a memory device connected to the at least one processor;
      a communication interface configured to permit communications with other controllers of the plurality of controllers via the network; and
      an intrusion detection system for detecting an attack on the industrial control system, the intrusion detection system having instructions that, when executed by the at least one processor, cause the at least one processor to:
         receive state information about the plurality of devices connected to the controller;
         receive, from additional controllers of the plurality of controllers via the communication interface, additional state information about devices connected to the additional controllers; and
         evaluate, with a plurality of first state estimators and a plurality of second state estimators, the received state information and the received additional state information to determine whether a device is operating within an expected range, wherein operation of the device outside of a corresponding expected range indicates an attack on the industrial control system, and wherein each device of the plurality of devices connected to the controller has a corresponding first state estimator of the plurality of first state estimators and each device of the devices connected to the additional controllers has a corresponding second state estimator of the plurality of second state estimators.

9. The industrial control system of claim 8, wherein the network is a peer-to-peer network.

10. The industrial control system of claim 9, wherein the instructions, when executed by the at least one processor, cause the at least one processor to share the received state information about the plurality of devices with the additional controllers of the plurality of controllers over the peer-to-peer network via the communication interface.

11. The industrial control system of claim 8, wherein the plurality of devices includes at least one sensor and at least one actuator.

12. The industrial control system of claim 8, wherein the instructions, when executed by the at least one processor, cause the at least one processor to generate a predicted value for a state of at least one of the plurality of devices.

13. The industrial control system of claim 12, wherein the instructions, when executed by the at least one processor, cause the at least one processor to determine whether the at least one of the plurality of devices is operating within the expected range based on the generated predicted value.

14. A method for detecting an attack on an industrial control system, the method comprising:
receiving, by an intrusion detection system, first state information from a plurality of first devices connected to a first industrial controller of the industrial control system, wherein the intrusion detection system is embedded in the first industrial controller;
receiving, by the intrusion detection system from one or more second industrial controllers of the industrial control system, second state information from one or more second devices connected to the one or more second industrial controllers, wherein the first industrial controller is connected to the one or more second industrial controllers by a network;
analyzing, by the intrusion detection system with a plurality of first state estimators and one or more second state estimators, the first state information and the second state information to assess whether a first device of the plurality of first devices or a second device of the one or more second devices is providing anomalous readings, wherein each first device of the plurality of first devices has a corresponding first state estimator of the plurality of first state estimators and each second device of the one or more second devices has a corresponding second state estimator of the one or more second state estimators;
determining, by the intrusion detection system, an attack on the industrial control system based on an assessment that a first device of the plurality of first devices or a second device of the one or more second devices is providing anomalous readings; and
taking action, by the intrusion detection system, to mitigate the attack on the industrial control system based on the determining.

15. The method of claim 14, further comprising:
aggregating, by the intrusion detection system, the first state information and the second state information; and
storing, by the intrusion detection system, the aggregated information in a stack, wherein the aggregated information stored in the stack is retrieved from the stack by an anomaly detector to assess whether a first device of the plurality of first devices or a second device of the one or more second devices is providing anomalous readings.

16. The method of claim 14, wherein analyzing the first state information and the second state information with the plurality of first state estimators and the one or more second state estimators includes generating, by each first state estimator, a first predicted value for a corresponding first device and generating, by each second state estimator, a predicted second value for a corresponding second device.

17. The method of claim 16, wherein analyzing the first state information and the second state information with the plurality of first state estimators and the one or more second state estimators includes determining whether the first predicted value is within a first confidence interval and whether the second predicted value is within a second confidence interval.

18. The method of claim 17, wherein analyzing the first state information and the second state information with the plurality of first state estimators and the one or more second state estimators includes determining the first confidence interval based on a predetermined number of historic values for the corresponding first device and determining the second confidence interval based on a predetermined number of historic values for the corresponding second device.

19. The method of claim 14, further comprising communicating, by the intrusion detection system, the first state information to corresponding intrusion detection systems of the one or more second industrial controllers.

* * * * *